US008866628B2

(12) United States Patent
Laasik et al.

(10) Patent No.: US 8,866,628 B2
(45) Date of Patent: Oct. 21, 2014

(54) COMMUNICATION SYSTEM AND METHOD

(75) Inventors: Marek Laasik, Tallinn (EE); Madis Kaal, Tallinn (EE)

(73) Assignee: Skype, Dublin (IE)

(*) Notice: Subject to any disclaimer, the term of this patent is extended or adjusted under 35 U.S.C. 154(b) by 644 days.

(21) Appl. No.: 12/455,652

(22) Filed: Jun. 4, 2009

(65) Prior Publication Data
US 2010/0060477 A1 Mar. 11, 2010

(30) Foreign Application Priority Data

Sep. 5, 2008 (GB) .................................. 0816279.4

(51) Int. Cl.
G08B 21/00 (2006.01)
H04N 21/4788 (2011.01)
H04N 21/422 (2011.01)
H04N 5/44 (2011.01)
H04N 21/488 (2011.01)
H04N 5/63 (2006.01)

(52) U.S. Cl.
CPC ......... *H04N 5/4403* (2013.01); *H04N 21/4788* (2013.01); *H04N 21/42222* (2013.01); *H04N 21/42221* (2013.01); *H04N 21/4882* (2013.01); *H04N 5/63* (2013.01)
USPC .................................. 340/636.1; 340/636.12

(58) Field of Classification Search
CPC ......... G07C 5/008; G07C 5/0808; H03H 7/40
USPC .................... 340/1.1, 12.1, 12.15, 12.22–12.3
See application file for complete search history.

(56) References Cited

U.S. PATENT DOCUMENTS

| 5,506,572 | A | * | 4/1996 | Hills et al. ............... 340/636.15 |
|---|---|---|---|---|
| 5,587,928 | A | | 12/1996 | Jones et al. |
| 5,812,770 | A | | 9/1998 | Sakai |
| 5,856,821 | A | | 1/1999 | Funahashi |
| 5,923,737 | A | | 7/1999 | Weishut et al. |
| 5,999,207 | A | | 12/1999 | Rodriguez et al. |
| 6,061,434 | A | | 5/2000 | Corbett |
| 6,151,619 | A | | 11/2000 | Riddle |
| 6,184,905 | B1 | | 2/2001 | Hartog |

(Continued)

FOREIGN PATENT DOCUMENTS

| DE | 197 16 486 A1 | 9/1998 |
|---|---|---|
| DE | 102006001607 | 8/2006 |
| WO | WO-2010026191 | 3/2010 |

(Continued)

OTHER PUBLICATIONS

Search Report from Application No. GB0816279.4, Dated: Nov. 26, 2009.

(Continued)

*Primary Examiner* — James Yang
(74) *Attorney, Agent, or Firm* — Sonia Cooper; Jim Ross; Micky Minhas

(57) ABSTRACT

A remote control unit for controlling a media device, comprising: a first wireless transmitter arranged to be powered from a first power source; a second wireless transmitter arranged to be powered from a second power source; a processor coupled to the first and second wireless transmitters, wherein the processor is configured to control the first and second wireless transmitters and is arranged to be powered from the first power; and monitoring means arranged to monitor power levels of the second power source and provide power level information to the processor.

30 Claims, 5 Drawing Sheets

(56) References Cited

U.S. PATENT DOCUMENTS

| | | |
|---|---|---|
| 6,209,025 B1 | 3/2001 | Bellamy |
| 6,243,129 B1 | 6/2001 | Deierling |
| 6,286,140 B1 | 9/2001 | Ivanyi |
| 6,628,964 B1 | 9/2003 | Bates et al. |
| 6,636,269 B1 | 10/2003 | Baldwin |
| 6,789,105 B2 | 9/2004 | Ludwig et al. |
| 6,930,661 B2 | 8/2005 | Uchida et al. |
| 7,058,901 B1 | 6/2006 | Hafey et al. |
| 7,099,693 B2 * | 8/2006 | Shin ........................... 455/557 |
| 7,184,049 B2 | 2/2007 | Ballin et al. |
| 7,454,711 B2 | 11/2008 | Angiulo et al. |
| 7,573,988 B2 | 8/2009 | Lee et al. |
| 7,587,684 B2 | 9/2009 | Perttula |
| 7,954,124 B2 | 5/2011 | Rambo |
| 7,966,039 B2 | 6/2011 | Sadovsky et al. |
| 7,983,722 B2 | 7/2011 | Lowles et al. |
| 8,407,749 B2 | 3/2013 | McLaughlin et al. |
| 8,413,199 B2 | 4/2013 | Laasik et al. |
| 8,421,839 B2 | 4/2013 | Kert |
| 8,473,994 B2 | 6/2013 | Blackburn et al. |
| 8,489,691 B2 | 7/2013 | Blackburn et al. |
| 8,520,050 B2 | 8/2013 | Blackburn et al. |
| 2001/0005197 A1 | 6/2001 | Mishra et al. |
| 2002/0109770 A1 | 8/2002 | Terada |
| 2002/0144259 A1 | 10/2002 | Gutta et al. |
| 2002/0199181 A1 | 12/2002 | Allen |
| 2003/0009768 A1 | 1/2003 | Moir |
| 2003/0036683 A1 | 2/2003 | Kehr et al. |
| 2003/0052648 A1* | 3/2003 | Hara et al. .................... 320/132 |
| 2003/0061033 A1* | 3/2003 | Dishert ........................ 704/201 |
| 2003/0070177 A1 | 4/2003 | Kondo et al. |
| 2003/0070182 A1 | 4/2003 | Pierre et al. |
| 2003/0097661 A1 | 5/2003 | Li et al. |
| 2003/0105812 A1 | 6/2003 | Flowers et al. |
| 2003/0117419 A1 | 6/2003 | Hermanson |
| 2003/0142802 A1 | 7/2003 | Hong et al. |
| 2004/0003025 A1 | 1/2004 | Hao |
| 2004/0049624 A1 | 3/2004 | Salmonsen |
| 2004/0060067 A1 | 3/2004 | Yi |
| 2004/0128700 A1 | 7/2004 | Pan |
| 2004/0135819 A1 | 7/2004 | Maa |
| 2004/0163127 A1 | 8/2004 | Karaoguz et al. |
| 2004/0176132 A1 | 9/2004 | Thrasher |
| 2004/0207723 A1 | 10/2004 | Davis et al. |
| 2004/0214541 A1 | 10/2004 | Choi |
| 2004/0258059 A1 | 12/2004 | Frank et al. |
| 2005/0071686 A1 | 3/2005 | Bagga et al. |
| 2005/0146598 A1 | 7/2005 | AbiEzzi et al. |
| 2005/0165922 A1 | 7/2005 | Hatano |
| 2005/0190700 A1 | 9/2005 | Melpignano |
| 2005/0249196 A1 | 11/2005 | Ansari et al. |
| 2005/0286711 A1 | 12/2005 | Lee et al. |
| 2005/0289480 A1 | 12/2005 | Mathews et al. |
| 2006/0040638 A1 | 2/2006 | McQuaide, Jr. |
| 2006/0080713 A1 | 4/2006 | Fujibayashi et al. |
| 2006/0095754 A1 | 5/2006 | Hyder et al. |
| 2006/0109268 A1 | 5/2006 | Napoli et al. |
| 2006/0158439 A1 | 7/2006 | Luo et al. |
| 2006/0181548 A1 | 8/2006 | Hafey et al. |
| 2006/0190443 A1 | 8/2006 | Mathews et al. |
| 2007/0039025 A1 | 2/2007 | Kraft et al. |
| 2007/0115346 A1 | 5/2007 | Kim et al. |
| 2007/0118866 A1 | 5/2007 | Chen |
| 2007/0139514 A1 | 6/2007 | Marley |
| 2007/0147367 A1 | 6/2007 | Hwang et al. |
| 2007/0156686 A1 | 7/2007 | Kim et al. |
| 2007/0214482 A1 | 9/2007 | Nguyen |
| 2007/0216759 A1 | 9/2007 | Gonen et al. |
| 2007/0275766 A1 | 11/2007 | Kim et al. |
| 2007/0279482 A1 | 12/2007 | Oswald et al. |
| 2008/0031169 A1 | 2/2008 | Shi et al. |
| 2008/0034325 A1 | 2/2008 | Ording |
| 2008/0062249 A1 | 3/2008 | Nagase et al. |
| 2008/0066131 A1 | 3/2008 | Chang et al. |
| 2008/0150892 A1 | 6/2008 | Duhig et al. |
| 2008/0152110 A1 | 6/2008 | Underwood et al. |
| 2008/0186410 A1 | 8/2008 | Hardacker et al. |
| 2009/0036159 A1 | 2/2009 | Chen |
| 2009/0167839 A1 | 7/2009 | Ottmar |
| 2009/0320073 A1 | 12/2009 | Reisman |
| 2010/0005497 A1 | 1/2010 | Maresca |
| 2010/0058408 A1 | 3/2010 | LaFreniere et al. |
| 2010/0060477 A1 | 3/2010 | Laasik et al. |
| 2010/0060715 A1 | 3/2010 | Laasik et al. |
| 2010/0060716 A1 | 3/2010 | Kert |
| 2010/0060788 A1 | 3/2010 | Blackburn et al. |
| 2010/0064328 A1 | 3/2010 | Laasik et al. |
| 2010/0064329 A1 | 3/2010 | McLaughlin et al. |
| 2010/0064333 A1 | 3/2010 | Blackburn et al. |
| 2010/0064334 A1 | 3/2010 | Blackburn et al. |
| 2011/0043599 A1 | 2/2011 | Luo et al. |
| 2011/0173672 A1 | 7/2011 | Angiolillo et al. |
| 2013/0222517 A1 | 8/2013 | Kert |
| 2013/0305175 A1 | 11/2013 | Blackburn |
| 2013/0314490 A1 | 11/2013 | Blackburn |

FOREIGN PATENT DOCUMENTS

| | | |
|---|---|---|
| EP | 0741484 A2 | 11/1996 |
| EP | 0919906 A2 | 11/1998 |
| EP | 1331762 | 7/2003 |
| EP | 1372333 A2 | 12/2003 |
| EP | 1622378 A1 | 2/2006 |
| EP | 1761048 A2 | 3/2007 |
| EP | 1853013 | 11/2007 |
| EP | 1860852 A1 | 11/2007 |
| EP | 1912175 A1 | 4/2008 |
| EP | 1 940 156 A2 | 7/2008 |
| EP | 2110796 A2 | 10/2009 |
| EP | 2353296 | 8/2011 |
| GB | 2410868 A | 8/2005 |
| GB | 2463110 | 3/2010 |
| GB | 2463124 | 3/2010 |
| JP | 2001169368 | 6/2001 |
| JP | 2001177632 | 6/2001 |
| JP | 2004040698 | 2/2004 |
| JP | 2004080289 | 3/2004 |
| JP | 2004186757 | 7/2004 |
| JP | 2004312320 | 11/2004 |
| JP | 2005039540 | 2/2005 |
| JP | 2007067979 | 8/2005 |
| JP | 2005236898 | 9/2005 |
| JP | 2006311582 | 11/2006 |
| JP | 2008141487 | 6/2008 |
| JP | 2008166980 | 7/2008 |
| JP | 2008182463 | 8/2008 |
| WO | WO 98/51079 A1 | 11/1998 |
| WO | WO 01/30070 A1 | 4/2001 |
| WO | WO 01/47210 A2 | 6/2001 |
| WO | WO 01/67315 A1 | 9/2001 |
| WO | WO 02/30105 A1 | 4/2002 |
| WO | WO 02/30116 A1 | 4/2002 |
| WO | WO 02/082343 A1 | 10/2002 |
| WO | WO-02082343 | 10/2002 |
| WO | WO 03/021960 A1 | 3/2003 |
| WO | WO 03021960 A1 * | 3/2003 |
| WO | WO 03/028373 A1 | 4/2003 |
| WO | WO 2005/009019 A2 | 1/2005 |
| WO | WO 2005/025194 A1 | 3/2005 |
| WO | WO 2007/098155 A2 | 8/2007 |
| WO | WO 2007/113580 A1 | 10/2007 |
| WO | WO 2007/127788 A2 | 11/2007 |
| WO | WO 2007127788 A2 * | 11/2007 |
| WO | WO 2008/030711 A2 | 3/2008 |
| WO | WO 2008030711 A2 * | 3/2008 |
| WO | WO 2009/094291 A1 | 7/2009 |
| WO | WO-2010026185 | 3/2010 |
| WO | WO-2010026187 | 3/2010 |
| WO | WO-2010026190 | 3/2010 |

OTHER PUBLICATIONS

International Search Report from International Application No. PCT/EP2009/061411, Dated: Nov. 26, 2009.

(56) References Cited

OTHER PUBLICATIONS

Written Opinion of the International Searching Authority from International Application No. PCT/EP2009/061411, Dated: Nov. 26, 2009.
"Advisory Action", U.S. Appl. No. 12/455,210, (Jun. 5, 2012), 2 pages.
"Advisory Action", U.S. Appl. No. 12/584,463, (May 17, 2012), 3 pages.
"Final Office Action", U.S. Appl. No. 12/455,085, (Aug. 16, 2012), 7 pages.
"Non-Final Office Action", U.S. Appl. No. 12/583,007, (Aug. 8, 2012), 6 pages.
"Non-Final Office Action", U.S. Appl. No. 12/584,463, (Aug. 3, 2012), 11 pages.
"Advisory Action", U.S. Appl. No. 12/455,084, (Mar. 21, 2012), 3 pages.
"Advisory Action", U.S. Appl. No. 12/455,653, (Nov. 21, 2011), 3 pages.
"Final Office Action", U.S. Appl. No. 12/455,084, (Jan. 17, 2012), 16 pages.
"Final Office Action", U.S. Appl. No. 12/455,210, (Mar. 19, 2012), 14 pages.
"Final Office Action", U.S. Appl. No. 12/455,653, (Sep. 14, 2011), 30 pages.
"Final Office Action", U.S. Appl. No. 12/584,463, (Feb. 24, 2012), 12 pages.
"Foreign Office Action", Great Britian Application No. 0907818.9, (Mar. 14, 2012), 4 pages.
"International Search Report and Written Opinion", Application No. PCT/EP2009/061413, (Apr. 12, 2009), 13 pages.
"International Search Report and Written Opinion", Application No. PCT/EP2009/061418, (Apr. 12, 2009), 13 pages.
"International Search Report and Written Opinion", Application No. PCT/EP2009/061410, (Oct. 20, 2009), 14 pages.
"International Search Report and Written Opinion", International Application No. PCT/EP2009/061409, (Oct. 20, 2009), 15 pages.
"International Search Report and Written Opinion", International Application No. PCT/EP2009/061416, (Oct. 21, 2009), 13 pages.
"International Search Report", Application No. PCT/EP2009/061406, (Dec. 4, 2009), 3 pages.
"International Search Report", GB Application 0907818.9, (Aug. 24, 2009), 1 pages.
"Non Final Office Action", U.S. Appl. No. 12/455,653, (Mar. 23, 2011), 22 pages.
"Non-Final Office Action", U.S. Appl. No. 12/455,084, (May 23, 2011), 14 pages.
"Non-Final Office Action", U.S. Appl. No. 12/455,085, (Mar. 15, 2012), 6 pages.
"Non-Final Office Action", U.S. Appl. No. 12/455,210, (Sep. 29, 2011), 14 pages.
"Non-Final Office Action", U.S. Appl. No. 12/584,463, (Oct. 13, 2011), 10 pages.
"Search Report and Written Opinion", PCT Application PCT/EP2009/061398, (Oct. 20, 2009), 15 pages.
"Search Report under Section 17", Application No. GB0816276.0, (Nov. 27, 2009), 2 pages.
"Search Report under Section 17", Application No. GB0816271.1, (Nov. 24, 2009), 2 pages.
"Search Report under Section 17", Application No. GB0816275.2, (Nov. 23, 2009), 1 page.
"Search Report", Application No. GB0816278.6, (Dec. 2, 2009), 2 pages.
"Search Report", Application No. GB081628.0, (Nov. 20, 2009), 2 pages.
"Search Report", Application No. GB0816280.2, (Dec. 3, 2009), 1 page.
"Written Opinion of the International Searching Authority", Application No. PCT/EP2009/061406, (Dec. 4, 2009), 5 pages.
"Advisory Action", U.S. Appl. No. 12/455,085, (Nov. 7, 2012), 3 pages.
"Corrected Notice of Allowance", U.S. Appl. No. 12/455,210, (Dec. 5, 2012), 2 pages.
"Examination Report", EP Application No. 0816280.2, (Feb. 29, 2012), 4 pages.
"Examination Report", GB Application No. 0816281.0, (Sep. 13, 2012), 2 pages.
"Final Office Action", U.S. Appl. No. 12/455,635, (Dec. 31, 2012), 25 pages.
"Foreign Office Action", Great Britain Application No. 0816279.4, (Mar. 8, 2012), 5 pages.
"Non-Final Office Action", U.S. Appl. No. 12/455,653, (Oct. 23, 2012), 28 pages.
"Notice of Allowance", U.S. Appl. No. 12/455,210, (Oct. 10, 2012), 4 pages.
"Notice of Allowance", U.S. Appl. No. 12/583,007, (Nov. 29, 2012), 4 pages.
"Notice of Allowance", U.S. Appl. No. 12/584,463, (Nov. 16, 2012), 7 pages.
"Corrected Notice of Allowance", U.S. Appl. No. 12/583,007, (Feb. 14, 2013), 2 pages.
"Corrected Notice of Allowance", U.S. Appl. No. 12/583,007, (Mar. 21, 2013), 2 pages.
"Notice of Allowance", U.S. Appl. No. 12/455,084, (Feb. 11, 2013), 4 Pages.
"Notice of Allowance", U.S. Appl. No. 12/455,653, (Mar. 6, 2013), 9 pages.
"Non-Final Office Action", U.S. Appl. No. 12/455,084, (Aug. 30, 2012), 29 pages.
"Non-Final Office Action", U.S. Appl. No. 12/455,635, (Aug. 22, 2012), 20 pages.
"Corrected Notice of Allowance", U.S. Appl. No. 12/455,084, (Apr. 15, 2013), 2 pages.
"Corrected Notice of Allowance", U.S. Appl. No. 12/455,085, (May 22, 2013), 2 pages.
"Corrected Notice of Allowance", U.S. Appl. No. 12/455,653, (Apr. 19, 2013), 4 Pages.
"Non-Final Office Action", U.S. Appl. No. 12/455,635, (Jun. 17, 2013), 25 pages.
"Notice of Allowance", U.S. Appl. No. 12/455,085, (Apr. 12, 2013), 5 pages.
"Supplemental Notice of Allowance", U.S. Appl. No. 12/455,084, (May 29, 2013), 2 pages.
"Corrected Notice of Allowance", U.S. Appl. No. 12/455,085, (Jul. 26, 2013), 2 pages.
"Final Office Action", U.S. Appl. No. 12/455,635, Jan. 22, 2014, 27 pages.
"Foreign Office Action", JP Application No. 2011-525548, Apr. 1, 2014, 3 pages.
"Foreign Office Action", JP Application No. 2011-525550, Mar. 25, 2014, 6 pages.
"Foreign Office Action", JP Application No. 2011-525548, Oct. 15, 2013, 8 pages.
"Non-Final Office Action", U.S. Appl. No. 13/942,452, Jun. 9, 2014, 14 pages.
"Foreign Notice of Allowance", JP Application No. 2011-525548, Aug. 5, 2014, 4 pages.

\* cited by examiner

COMMUNICATION SYSTEM AND METHOD

This invention relates to a communication system and method.

RELATED APPLICATION

This application claims priority under 35 U.S.C. §119 or 365 to Great Britain Application No. 0816279.4, filed Sep. 5, 2008. The entire teachings of the above application are incorporated herein by reference.

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A problem with packet-based communication systems is that the accessibility of packet-based communications for users is limited. In particular, such networks are most commonly accessed using a personal computer. This has the disadvantage that the user must be sufficiently technically competent to download and install the packet-based communication client software on their personal computer, which provides a barrier to the take-up of the use of the packet-based communication system. Even when the communication client is installed and executed on a personal computer, the use of the packet-based communication system may be limited because personal computers are often not located in a place where the user is either familiar or comfortable with communicating. For example, a personal computer is often located in a study, which is not the most natural or familiar environment for making calls for many users.

Whilst packet-based communication systems can also be accessed via certain mobile devices, these generally do not have processing resources or display screens available to offer a full range of features, such as video calling.

There is therefore a need for a technique to address the aforementioned problems with the accessibility of packet-based communication systems.

According to one aspect of the present invention there is provided a remote control unit for controlling a media device, comprising: a first wireless transmitter arranged to be powered from a first power source; a second wireless transmitter arranged to be powered from a second power source; a processor coupled to the first and second wireless transmitters, wherein the processor is configured to control the first and second wireless transmitters and is arranged to be powered from the first power source; and monitoring means arranged to monitor power levels of the second power source and provide power level information to the processor.

By providing two separate wireless transmitters (such as IR and Bluetooth) which are powered by separate power sources the remote control unit can retain limited functionality when the more power-hungry of the two communication devices has depleted its power source. The depletion of the one power source can be reported to the user, even in the case that the power of that power source is completely depleted. In other words, the remote control is not limited to reporting only a "battery low" condition, but can report complete depletion. The monitoring and reporting of the power level of the one power source enables the user to be clearly informed of the status.

The processor may be further arranged to transmit a status message comprising the power level information using the first wireless transmitter.

Preferably, the processor is further arranged to compare the power level information to a predetermined threshold level, and transmit a status message using the first wireless transmitter if the power level information is less than the predetermined threshold level.

The remote control unit may further comprise microphone circuitry arranged to provide audio information to the processor, and arranged to be powered from the second power source. The processor may be arranged to transmit data representing the audio information using the second wireless transmitter.

Preferably, the first wireless transmitter is an infra-red transmitter. Preferably, the second wireless transmitter is a radio transmitter. The radio transmitter may be a Bluetooth transmitter. Preferably, the first and second power sources are batteries.

The monitoring means may be arranged to monitor the voltage level of the second power source.

According to another aspect of the present invention there is provided a television receiver system comprising the remote control unit.

The television receiver system may comprise a television receiver unit, and the television receiver unit may comprise: a memory storing a communication client application; a communication processing means, coupled to the memory and operable to execute the communication client application, wherein the client application is programmed so as when executed to allow a user to establish a call with one or more other users via a packet-based communication network; a first wireless receiver arranged to receive signals from the first wireless transmitter of the remote control unit and coupled to the communication processing means; and a second wireless receiver arranged to receive signals from the second wireless transmitter of the remote control unit and coupled to the communication processing means.

The first wireless receiver may be arranged to receive the status message from the first wireless transmitter and provide the status message to the communication processing means, and the communication processing means may be arranged to generate a warning message for display to the user responsive thereto.

Preferably, the warning message indicates to the user that a call cannot be established over the packet-based communication network due to depletion of the second power source.

The communication processing means may be arranged to transmit a notification message to the one or more other users over the packet-based communication network responsive to receiving the status message from the remote control unit.

Preferably, the notification message indicates to the one or more other users that a call cannot be established with the user over the packet-based communication network.

Preferably, the television receiver unit comprises television receiver means operable to receive broadcast television signals. The television receiver means may be arranged to be controlled by commands transmitted from the first wireless transmitter of the remote control unit and received at the first wireless receiver.

The television receiver unit may comprise one of a television set and a set-top box.

The client application may be configured establish a call with one or more other users via a peer-to-peer packet-based communication network.

According to another aspect of the invention there is provided a games console system comprising the remote control unit.

The games console system may comprise a games console unit, and the games console unit may comprise: a memory storing a communication client application; a communication processing means, coupled to the memory and operable to execute the communication client application, wherein the client application is programmed so as when executed to allow a user to establish a call with one or more other users via a packet-based communication network; a first wireless receiver arranged to receive signals from the first wireless transmitter of the remote control unit and coupled to the communication processing means; and a second wireless receiver arranged to receive signals from the second wireless transmitter of the remote control unit and coupled to the communication processing means.

According to another aspect of the invention there is provided a video-playback system comprising the remote control unit.

The video-playback system may comprise a video-playback unit, and the video-playback unit may comprise: a memory storing a communication client application; a communication processing means, coupled to the memory and operable to execute the communication client application, wherein the client application is programmed so as when executed to allow a user to establish a call with one or more other users via a packet-based communication network; a first wireless receiver arranged to receive signals from the first wireless transmitter of the remote control unit and coupled to the communication processing means; and a second wireless receiver arranged to receive signals from the second wireless transmitter of the remote control unit and coupled to the communication processing means.

The video-playback unit may comprise one of a video disc player and a personal video recorder.

According to another aspect of the invention there is provided a method of monitoring power in a remote control unit for controlling a media device, the remote control unit having a first wireless transmitter arranged to be powered from a first power source and a second wireless transmitter arranged to be powered from a second power source, the method comprising: measuring a power level of the second power source; comparing the power level of the second power source to a predetermined threshold; and transmitting a status message using the first wireless transmitter in the case that the power level of the second power source is less than the predetermined threshold.

The method may further comprise the step of receiving a signal to accept an incoming call request from a user of the remote control unit, and wherein the steps of measuring, monitoring and transmitting are performed responsive to receiving the signal to accept an incoming call.

The method may further comprise the step of receiving a signal to initiate a call from a user of the remote control unit, and wherein the steps of measuring, monitoring and transmitting are performed responsive to receiving the signal to initiate a call.

The method may further comprise the step of starting a periodic timer, wherein the steps of measuring and monitoring are performed responsive to the expiry of the periodic timer.

In one embodiment, the step of transmitting is performed responsive to the expiry of the periodic timer. In another embodiment, the step of transmitting is performed responsive to receiving a command to transmit a signal using the first wireless transmitter from a user of the remote control unit.

The method may further comprise the steps of: receiving the status message at a first wireless receiver located remote from the remote control unit; and displaying a warning message indicating the depletion of the second power source on a display means to a user of the remote control unit.

The method may further comprise the step of transmitting a notification message to one or more other users over a packet-based communication network responsive to receiving the status message from the remote control unit.

According to another aspect of the invention there is provided a computer program product comprising program code means which, when executed by a computer implement the steps according to the above method.

For a better understanding of the present invention and to show how the same may be put into effect, reference will now be made, by way of example, to the following drawings in which.

Figure 1:
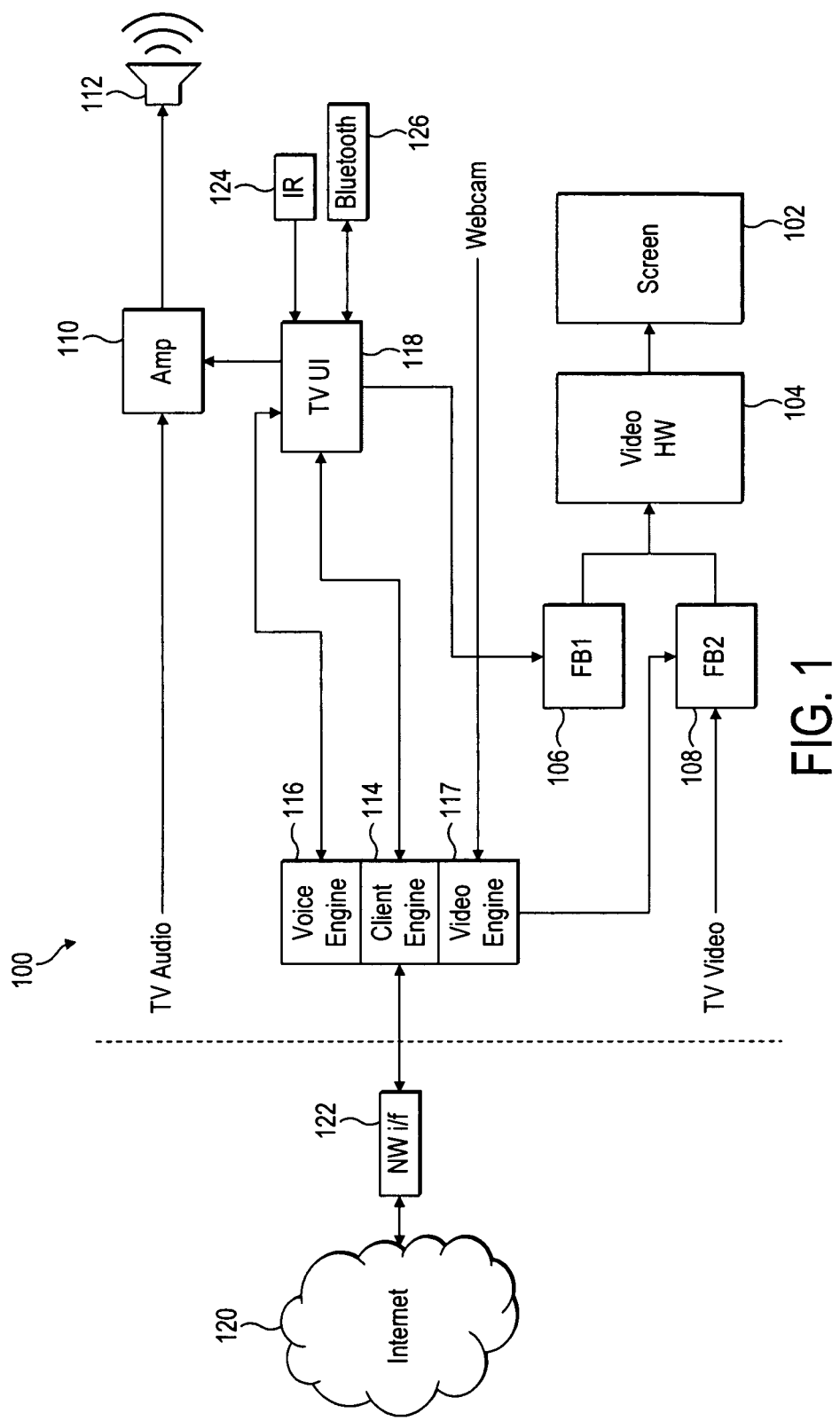
FIG. 1 is a block diagram showing the functional blocks of a TV with an embedded communication client.

In order to overcome the above-mentioned problems with packet-based communication systems, a technique has been developed to enable a user to access such packet-based communication systems from a television ("TV"). This is achieved either by embedding the communication client into the TV itself, or through a separate set-top box ("STB") connected to the TV. In alternative embodiments, the embedded communication client can reside in another device connected to a TV, such as a games console or video playback device (e.g. a video disc player or a personal video recorder).

This is advantageous because the TV can be provided with all the embedded hardware and software required to access the packet-based communication system built-in. Alternatively, this can be embedded into a STB (or other TV-connected device) which is readily connected to an existing TV using known interfaces (such as HDMI or SCART, for example). This eliminates the need for the user to download and install software on their personal computer, and provides a simpler method by which non-technical users can access the packet-based communication system in their home. In addition, the TV is typically located in a living room of a house, which enables the packet-based communication system to be accessed from the location in the house which is most familiar to many users for communicating with friends and relatives due to this being the traditional location for landline PSTN telephones.

The embedding of a packet-based communication client in a TV also has the advantage that a large screen is present, which can be utilised for video calling and the clear display of graphical user interfaces. Furthermore, significant processing power can be provided in the TV, particular as the power requirements for a large, mains electricity powered consumer electronics device are less stringent than, for example mobile devices. This enables a full range of features to be included in the embedded communication client, such as high quality voice and video encoding.

Known TVs are not designed to accommodate any form of bi-directional communications. A system is therefore required for enabling user interaction with the TV for making and receiving calls and messages which is intuitive for users. To achieve this, the remote control of the TV (or STB) is enhanced to provide functionality which enables the user to make and receive calls, as well as send and receive messages using the TV.

However, a problem with enhancing the functionality of remote controls to enable the user to make calls and receive messages is that the power consumption at the remote control increases significantly. This is problematic since the remote control is a battery-powered device, and the user will therefore need to change the batteries more frequently. Alternatively, if the remote control uses rechargeable batteries, the user will need to charge them more frequently. There is therefore a need for careful power management techniques at the remote control. This is particularly the case in view of the fact that the remote control is being used to control the TV as well providing communication functionality. If the batteries are depleted in the remote control due to the user using communication functionality, then this also means that the user is unable to control the TV (i.e. to change channels, etc.) This causes significant frustration on the part of the user.

Reference is now made to FIG. 1, which illustrates the hardware and software functional blocks embedded in a TV 100 which utilises the enhanced remote control to be described hereinafter. The TV 100 comprises a screen 102 for displaying images to the user, which is driven by video driver hardware 104 arranged to convert the video signals into the form required to be correctly displayed on the screen 102. The video driver hardware 104 is provided with digital video data from two frame buffers 106 and 108. The frame buffers 106 and 108 are storage devices that buffer video data that is to be displayed to the user. Frame buffer 2 ("FB2") 108 receives standard TV video signals, as is known for the display of broadcast TV. Frame buffer 1 ("FB1") 106 stores video data related to the packet-based communication client, as will be described presently. An audio amplifier 110 receives TV audio signals and amplifies these for output through at least one speaker 112.

The TV audio and video input signals themselves originate from television signals broadcast via any suitable means such as a satellite repeater stations, wireless terrestrial repeater stations or cable; and received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer; and/or an analogue to digital converter.

After being received by the receiver unit, the signals are then processed by a signal processing apparatus (also not shown) before being input to the frame buffer and amplifier of FIG. 1. The signal processing may comprise for example a digital filter, demultiplexer, decoder, decryption block, and/or error checking block; which may be implemented in on-chip hardware in the form of one or more on-chip peripherals (not shown), off-chip hardware in the form of one or more off-chip units accessed via one or more of the I/O peripherals, or in software stored in a memory and executed on a central processing unit (CPU) of the television 100 (not shown), or in any combination of these.

The packet-based communication client embedded in the TV 100 is based around four main elements. Preferably, these four elements are software elements that are executed on a processor and stored in a memory. The four elements are: a client engine 114; a voice engine 116; a video engine 117; and a TV user interface 118.

The client engine 114 is responsible for setting up connections to the packet-based communication system. This is performed via a connection from the TV 100 to the internet 120. The TV 100 is connected to the internet 120 via a network interface 122 such as a modem, and the connection between the TV 100 and the network interface 122 may be via a cable (wired) connection or a wireless connection. The client engine 114 performs call set-up, authentication, encryption and connection management, as well as other functions relating to the packet-based communication system such as firewall traversal, presence state updating, and contact list management.

The voice engine 116 is responsible for the encoding of voice signals input to the TV 100 as VoIP packets for transmission over the internet 120 and the decoding of VoIP packets received from the internet 120 for presentation as audio information to the user of the TV 100.

The video engine 117 is responsible for the encoding of video signals input to the TV (e.g. from a webcam or other video camera) as video packets for transmission over the internet 120 in a video call, and the decoding of video packets received from the internet 120 in a video call for presentation as video images to the user of the TV 100.

The TV user interface ("UI") 118 is responsible for presenting visual information to the user of the TV 100 in the form of a graphical user interface displayed on the TV screen 102.

The client engine 114 is connected to the TV UI 118 in order to control what the UI displays to the user. The client engine 114 is also closely integrated with the voice engine 116 and video engine 117 for the efficient transmission and receiving of voice and video packets over the internet.

The voice engine 116 is connected to the TV UI 118 as voice signals from the user are passed through the TV UI 118 to the voice engine 116, and vice versa. The video engine 117 is connected to FB2 108 for providing video data to be displayed on the TV screen 102.

The TV UI 118 is connected to FB1 106, so that the graphical user interface data is buffered and ultimately displayed to the user on the screen 102. The TV UI 118 is also connected to the amplifier 110, enabling sound (such as voice signals or notifications) to be produced from the TV speakers 112. The TV UI 118 is also connected to an infra-red ("IR") receiver 124 and a bluetooth transceiver 126 which are used for communicating with a remote control unit, as will be discussed below.

Note that if the embedded communication client is provided in the form of a STB (or other TV-connected device) for connection to a TV, then the system in FIG. 1 differs only in that the screen 102, amplifier 110 and speaker 112 blocks are located in the TV itself, whereas the remaining functional blocks are located in the set top box, which is connected to the TV.

Figure 2:
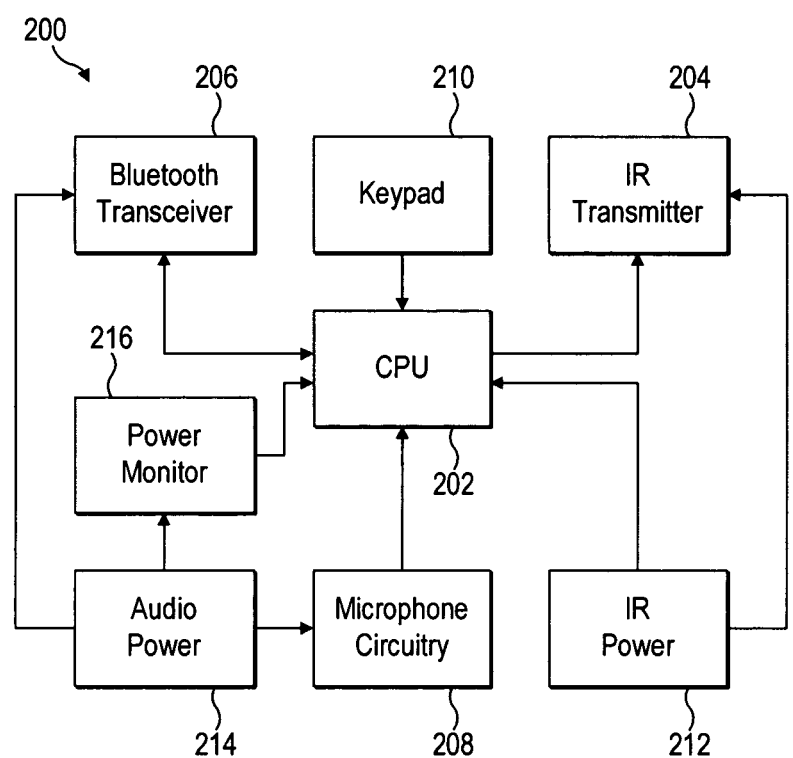
FIG. 2 is a block diagram showing the functional blocks of a remote control unit for use with the TV of FIG. 1.

Reference is now made to FIG. 2, which illustrates the functional blocks of a remote control unit 200 arranged to communicate with the TV 100 of FIG. 1. The remote control unit 200 comprises a central processing unit ("CPU") 202 arranged to control the operation of the remote control unit 200. In particular, the CPU 202 controls the sending and receiving of data between the TV 100 and the remote control unit 200.

The remote control unit 200 is arranged to communicate with the TV 100 by two different methods. Firstly, the remote control comprises an IR transmitter 204, which sends IR signals to the IR receiver 124 in the TV 100. This is performed in a similar manner to conventional remote control units used with televisions. This has the advantage of being power efficient, which is important for a battery powered device such as a remote control. However, this also has the disadvantage of requiring a line-of-sight signal path and has a low data rate. The IR transmitter 204 is therefore used for sending commands to the TV 100. These commands include conventional TV commands, such as changing channels, switching to standby and adjusting volume, as well as commands relating to the embedded communication client, as will be described hereinafter.

The second method for communicating with the TV 100 is by a radio link such as a Bluetooth connection. The remote control unit 200 comprises a Bluetooth transceiver 206 which is able to communicate with the Bluetooth transceiver 126 located in the TV 100. Bluetooth is a low-power short-range radio standard, and therefore does not require a line-of-sight signal path. Higher data rates are also available for Bluetooth connections, compared to IR. The Bluetooth transceiver 206 is paired with the Bluetooth transceiver 126 located in the TV 100 such that a data connection can be readily formed between them. The data connection enables the transmission of data from the remote control unit 200 to the TV 100, and, optionally, the reception of data from the TV 100 at the remote control unit 200.

The IR transmitter 204 and the Bluetooth transceiver 206 are connected to the CPU 202, and the CPU 202 controls the activation of these units and provides them with the data to be sent (and optionally reads the data received by the Bluetooth transceiver 206).

Also connected to the CPU 202 is microphone circuitry 208. The microphone circuitry 208 is arranged to receive audio information such as speech from the user of the remote control unit 200 and provide the audio information to the CPU 202 for processing. The audio information can be speech which is subsequently sent to the TV 100, and transmitted over the internet as VoIP packets, as will be described in more detail hereinafter. The microphone circuitry 208 comprises a microphone, an amplifier, and an analogue-to-digital converter for generating a digital representation of the audio signals which can be input to the CPU 202.

Optionally connected to the CPU 202 is speaker circuitry (not shown in FIG. 2). The speaker circuitry is arranged to receive audio data from the CPU 202 and generate audible sound that the user of the remote control can hear. The speaker circuitry can comprise a digital-to-analogue converter, an amplifier and a speaker. The speaker circuitry can be used to enable the user of the remote control unit 200 to hear voice calls from a remote party over the internet, as will be described later.

A keypad 210 is connected to the CPU to enable the user to enter commands, activate functions and control the TV and communication client. The keypad layout is described later with reference to FIG. 3.

As mentioned before, the problem with providing enhanced functionality in the remote control (as enabled by the Bluetooth transceiver and the microphone circuitry) is that these additional elements significantly increase the power consumption at the remote control unit, and causes problems for the operation of the TV when the batteries are depleted through the use of communication functionality.

In order to address this problem, two separate power sources are provided in the remote control. Typically, this takes the form of a plurality of batteries, at least one of which constitutes a first power source, and at least another one of which constitutes a second power source. The two power sources can be in the form of non-rechargeable or rechargeable batteries, or a combination of both.

As shown in FIG. 2, a first one of the power sources is an IR power source 212. The IR power source 212 is connected to, and provides power to, the IR transmitter 204 and the CPU 202. A second one of the power sources is an audio power source 214. The audio power source is connected to, and powers, the Bluetooth transceiver 206 and the microphone circuitry 208.

A power monitor device 216 is connected to the audio power source 214. The power monitor device 216 can measure the power level of the audio power source 214 and provide this measurement to the CPU 202, which can act responsive to this measurement. Preferably, the power monitor device 216 monitors the voltage level of the audio power source 214. The power monitor device can take the form of an analogue to digital converter ("ADC") which reads the voltage level of the audio power source 214 and converts this to digital data that can be read by the CPU 202.

The provision of a separate IR power source 212 and an audio power source 214 with a power monitor provides several advantages. Because the IR transmitter 204 and CPU 202 are powered from a separate power source from the Bluetooth transceiver 206 and microphone circuitry 208, limited functionality can still be provided once the audio power source 214 has been depleted from the use of the communication functionality. This can happen because the Bluetooth transceiver 206 and microphone circuitry have greater power requirements than the IR transmitter 204. Therefore, even though the audio parts (206, 208) are not operational once the audio power source 214 is depleted, the remote control unit 200 can still be used to control the TV using the IR transmitter, and can also provide limited communication functionality using IR commands (for example instant messaging).

The use of two power sources can also be used advantageously to provide increased information to the users. For example, a remote control that only uses a single power source can notify a user when the single power source is nearing depletion, but cannot inform a user when the power source is completely depleted, as a command to this effect cannot be sent from the remote control. Therefore, the users must determine themselves that the reason for being unable to operate the TV using the remote control is due to the remote control power source being depleted. In contrast, the remote control of FIG. 2 retains limited functionality even once the audio power source 214 is completely depleted. The IR transmitter 204 can be used to send a command to the TV 100 to indicate that the audio power source is depleted, and the TV 100 can notify the user of this situation via an on-screen message. In addition, contacts of the user of the remote control unit can also be informed that the user is unable to take calls (due to the depleted audio power supply) over the packet-based communication system, as described hereinafter. The monitored power level of the audio power source 214 can also be utilised to warn the user if the power level is so low that a call is unlikely to be completed successfully. The operation of the remote control utilising the two power sources to achieve these advantages is described below with reference to FIGS. 4 and 5.

Figure 3:
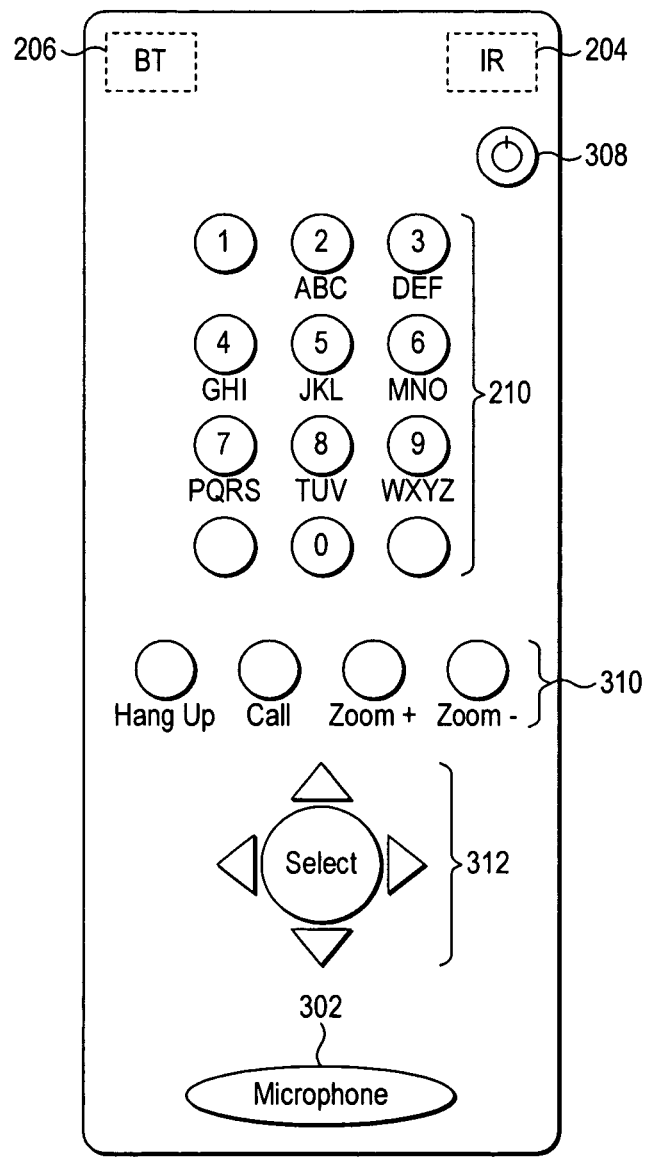
FIG. 3 shows the physical layout of a remote control unit.

Reference is now made to FIG. 3, which illustrates the physical layout of the remote control unit 200. The remote control unit 200 resembles conventional remote controls for TVs. However, the remote control unit 200 includes an integrated microphone 302, and, optionally, an integrated speaker (not shown in FIG. 3). Integrated within the unit are an IR transmitter 204 and Bluetooth transceiver 206, as described above.

The remote control unit 200 further comprises a keypad 210, which is used for conventional TV control purposes, and also for entering information for the embedded packet-based communication client. The keypad 210 comprises numbered keys that can also be used to enter alphabetic characters. A standby button 308 is used for placing the TV 100 into standby mode. Dedicated function keys 310 are used to control the operation of the packet-based communication client, and a directional pad 312 is used for navigating the TV user interface.

Figure 4:
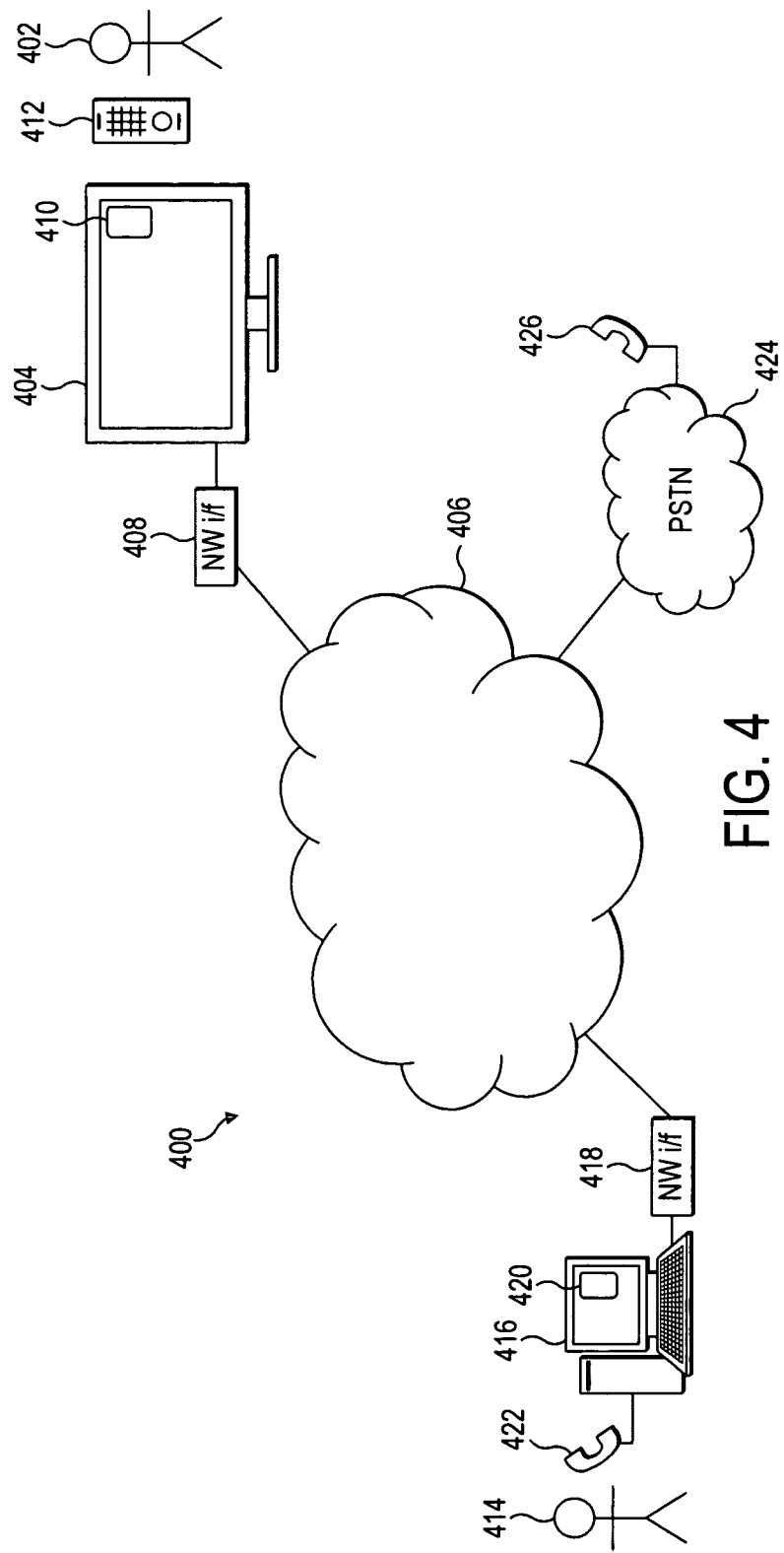
FIG. 4 shows an illustrative packet-based communication system.

In order to describe the operation of the TV 100 and enhanced remote control unit 200 with the packet based communication system, reference is now made to FIG. 4, which illustrates the use of the TV 100 in a portion of an example system 400.

Note that whilst the illustrative embodiment shown in FIG. 4 is described with reference to a P2P communication system, other types of communication system could also be used, such as non-P2P, VoIP or IM systems. The system 300 shown in FIG. 4 shows a first user 402 of the communication system operating a TV 404, which is shown connected to a network 406. Note that the communication system 400 utilises a network such as the Internet. The TV 404 is connected to the network 406 via a network interface 408 such as a modem, and the connection between the user terminal 104 and the network interface 108 may be via a cable (wired) connection or a wireless connection. The TV 404 shown in FIG. 4 is a standalone unit, but it should be appreciated that a separate TV and STB can also be used.

The TV 404 is executing an embedded communication client 410. Note that in alternative embodiments, the embedded communication client can be executed in a set top box. The embedded communication client 410 comprises software executed on a local processor in the TV 404.

The TV 404 is arranged to receive information from and output information to the user 402. A remote control unit 412 acts as the input device operated by the user 402 for the control of the TV 404. The remote control 412 comprises a microphone and (optionally) a speaker to enable the user to speak and (optionally) listen in a voice call. The remote control unit 412 communicates wirelessly with the TV 404, as described previously.

The TV 404 can also receive broadcast television signals, and display these as video (television programs) to the user on the TV screen. The broadcast television signals can be delivered by terrestrial, satellite or cable broadcasting, and be in the form of analogue signals or digital data. The user 402 can control the display of the television signals (e.g. which channels to display) using the remote control unit 412.

The embedded communication client 410 is arranged to establish and manage calls made over the packet-based communication system using the network 406. The embedded communication client 410 is also arranged to present information to the user 402 on the screen of the TV 404 in the form of a user interface. The user interface comprises a list of contacts associated with the user 402. Each contact in the contact list has a presence status chosen by the contact associated with it, and each of these contacts have authorised the user 402 of the client 410 to view their contact details and contact-defined presence state.

According to the invention in certain embodiments there is provided a video-playback system as described above having the following features:

The contact list for the users of the packet-based communication system is stored in a contact server (not shown in FIG. 4). When the client 410 first logs into the communication system the contact server is contacted, and the contact list is downloaded to the client 410. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 410, and allows this information to be consistent for the user when logging on from different terminals. The client 410 also periodically communicates with the contact server in order to obtain any changes to the information on the contacts in the contact list, or to update the stored contact list with any new contacts that have been added.

Also connected to the network 406 is a second user 414. In the illustrative example shown in FIG. 4, the user 404 is operating a user terminal 416 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 416 comprises a display such as a screen and an input device such as a keyboard, mouse, joystick and/or touch-screen. The user device 416 is connected to the network 406 via a network interface 418 such as a modem.

Note that in alternative embodiments, the user terminal 416 can connect to the communication network 406 via additional intermediate networks not shown in FIG. 4. For example, if the user terminal 416 is a mobile device, then it can connect to the communication network 406 via a mobile network (for example a GSM or UMTS network).

The user terminal 416 is running a communication client 420, provided by the software provider. The communication client 420 is a software program executed on a local processor in the user terminal 416 comprising similar elements to the embedded communication client 410. The communication client 420 enables the user terminal 416 to connect to the packet-based communication system. The user terminal 416 is also connected to a handset 422, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 416, or integrated into the user terminal 416 itself.

Presuming that the first user 402 is listed in the contact list of the client 420 presented to second user 414, then the second user 414 can initiate a call to the first user 402 over the communication system by selecting the contact and clicking on a "call" button using a pointing device such as a mouse. The call set-up is performed using proprietary protocols, and the route over the network 406 between the calling user and called user is determined by the peer-to-peer system without the use of servers.

Following authentication through the presentation of digital certificates (to prove that the users are genuine subscribers of the communication system—described in more detail in WO 2005/009019), the call can be established.

Referring again to FIGS. 1 and 2, when the incoming call is received at the client engine 114 the TV UI 118 is notified of the incoming call. This places the TV UI 118 into an incoming call state, such that key presses from remote are interpreted appropriately for this state. The TV UI 118 outputs graphics to the FB1 106 to display a notification of the incoming call on the TV screen 102, such that the user 402 is aware of the incoming call. The notification may only be active for a predetermined time, after which time the notification will fade and the incoming call state will be deactivated. Note further that the notification method can change depending on whether or not the TV is in standby mode or is active. If the TV 100 is active, the notification is displayed on the screen 102. If the TV is in standby mode, the client engine 114 can control the TV UI 118 to notify the user of an incoming call by producing a sound (via the amplifier 110 and speakers 112), flashing an LED (not shown in FIG. 1) or activating the TV screen 102.

Figure 5:
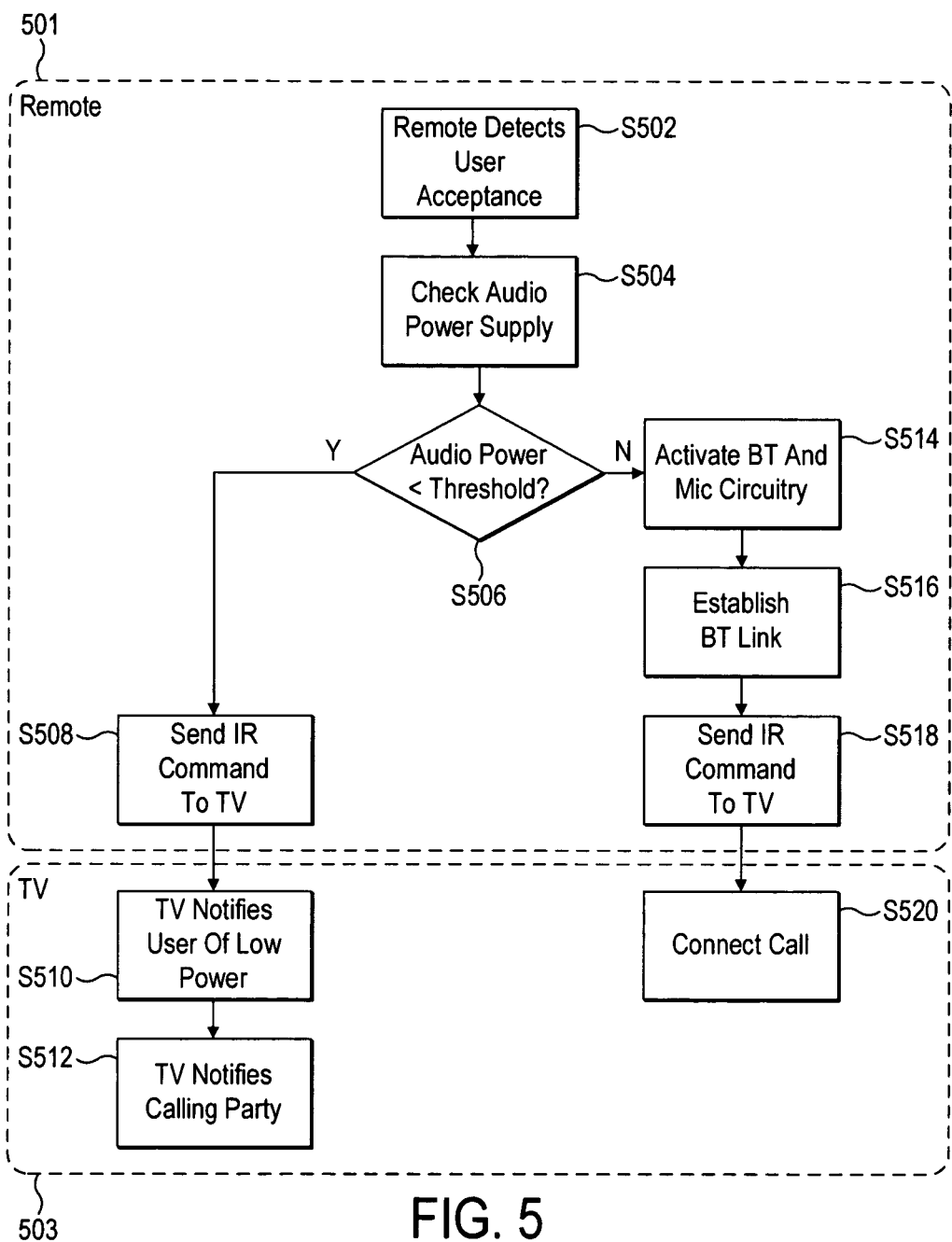
FIG. 5 shows a flowchart of a process performed when the user is notified of an incoming call.

Reference is now made to FIG. 5, which illustrates a flow-chart of the processes performed when the user is notified of an incoming call. Note that box 501 indicates the steps performed at the remote control unit 200, and box 503 indicates the steps performed at the TV 100.

The user 402 can select to answer the incoming call by pressing a key on the remote control unit 412 or enacting a physical motion such as sliding out a movable microphone unit. In step S502, the remote control 200 detects that the user has selected to accept the call. In response to the user 402 selecting to answer the incoming call the CPU 202 in the remote control unit 200 reads the power level of audio power source 214 from the power monitor 216 in step S504.

In step S506, the CPU 202 determines whether the power level of the audio power source 214 is less than a predetermined threshold. Preferably, the CPU 202 reads the voltage level of the audio power source 214 to determine whether this has dropped below a certain value that indicates that the audio power source 214 does not have sufficient power to support a call.

If it is determined in step S506 that the power level of the audio power source 214 is below the predetermined threshold, then in step S508 the remote control unit 200 transmits a command to the TV 100 using the IR transmitter 204. This command indicates that the user has selected to accept the call (either by pressing a button or performing an action) but that the call cannot be supported at the remote control due to insufficient power.

In step S510, the TV 100 receives this command via the IR receiver 124 and the TV UI 118 generates a notification message to the user in order to explain why the call cannot be accepted. This notification message is displayed on the screen of the TV 100.

In addition, in step S512, the communication client 114 can inform the calling party 414 or other contacts of the first 402 user that the first user 402 cannot currently be contacted using voice calling. In one embodiment, the communication client can transmit an automatically generated IM message to the second user 414, which states that the first user 402 cannot be contacted via a voice call. This IM message can further indicate that the first user 402 is able to communicate via IM messaging instead. The first user 402 is able to communicate using IM messaging, as this can be performed even if the audio power source is depleted. This is because the text input required for IM messaging can be sent from the remote control unit using the IR transmitter 204, which is still powered by the IR power source 212. In another embodiment, the communication client can automatically change the first user's 402 mood message such that it indicates that the first user 402 is not able to receive voice calls (but can receive IM messages). The mood message text is distributed to all the contacts of the first user 402.

Returning again to step S506, if it is determined that the power level of the audio power source 214 is above the predetermined threshold, then the CPU 202 allows the call to be established as there is sufficient power to support it. In step S514 the remote control unit 200 activates the Bluetooth transceiver 206 and the microphone circuitry 208. The Bluetooth transceiver 206 and the microphone circuitry 208 are not activated until they are needed to save power consumption at the audio power source 214. In step S516, the Bluetooth transceiver 206 establishes a connection with the Bluetooth transceiver 126 in the TV 100.

In step S518, the remote control unit 200 transmits a command to the TV 100 using the IR transmitter 204. This command indicates that the user has selected to accept the call (either by pressing a button or performing an action), and that there is sufficient power to support it.

In step S522, the TV 100 connects the call as follows. When the TV UI 118 receives the command transmitted via the IR transmitter 204 at the IR receiver 124, this is interpreted as a call accept command, since the TV UI 118 is in the incoming call state. Note that in alternative embodiments, the IR command sent from the remote control unit 200 command can be omitted, and the establishment of the Bluetooth connection between the TV 100 and the remote control unit 200 can be interpreted as a call accept command instead.

The TV UI 118 outputs an "answer call" command to the client engine 114. In response to the "answer call" message, the client engine 114 establishes the call connection with the communication client 420 of the calling user 414.

When the user 402 talks into the microphone 302 (shown in FIG. 3), the audio signal is converted to digital data by the microphone circuitry 208 and input to the CPU 202. The CPU 202 controls the Bluetooth transceiver 206 to transmit the audio information to the Bluetooth transceiver 126 of the TV 100. The transmission of the audio information can utilise a standard Bluetooth protocol for transmitting audio data.

Upon receiving the audio information at the Bluetooth transceiver 126, the TV UI 118 passes the audio information to the voice engine 116. The voice engine 116 encodes the audio information as VoIP packets and passes these to the client engine 114. The client engine 114 transmits the VoIP packets to the network 406 via the network interface 408, where they are routed to the communication client 420 running on the user terminal 416 of the second user 414. The client 420 decodes the VoIP packets to produce an audio signal that can be heard by the user 414 using the handset 422.

Conversely, when the second user 414 talks into handset 422, the client 420 executed on user terminal 416 encodes the audio signals into VoIP packets and transmits them across the network 406 to the TV 404. The VoIP packets are received at the client engine 114 and passed to the voice engine 116. The voice engine 116 decodes the VoIP packets to produce audio information. The audio information is passed to the TV UI 118.

In one embodiment, the audio information is passed from the TV UI 118 to the amplifier 110, such that the voice from the second user 414 is heard from the TV speakers 112. If the TV 100 is currently being used to watch a TV program, then the audio from the TV program can be deactivated. Alternatively, the audio from the call can be mixed with the TV program audio, which can be decreased in volume.

In an alternative embodiment, if the remote control unit 200 comprises the optional speaker circuitry, as described above with reference to FIG. 2, the audio information from the TV UI 118 can be passed to the Bluetooth transceiver 126 and transmitted to the remote control unit 200. At the remote control unit 200, it is received by the Bluetooth transceiver 206, and interpreted by the CPU 202 and converted to audible signals by the speaker circuitry. The user can then hear the voice of the second user 414 from the speaker in the remote control unit 200. Concurrently with this, the TV UI 118 can control the amplifier 110 to deactivate or decrease the volume of the audio signals of a TV program that may be being viewed at the same time. Having a speaker located in the remote control unit 200 is advantageous because it enables the user to operate the remote control unit 200 in a manner similar to a traditional telephone handset, which is familiar to the user. In addition, it enables the user to move around while communicating (within the confines of the Bluetooth transceiver range) in a similar manner to a cordless telephone. However, the presence of the speaker circuitry in the remote control unit 200 does give rise to higher power consumption at the remote. Note that the speaker circuitry, if present at the remote control unit, is powered by the audio power supply 214.

The remote control unit 200 can also be used for initiating a call to another party. For example, the first user 402 can use the remote control unit 200 to initiate a call to the second user 414. Typically, the TV UI 118 displays a UI to the user comprising the contact list and a contact name/phone number entry field. The first user 402 can select the second user 414 from the contact list and initiate the call using the remote control unit. The call initiation can be started by the user selecting a calling functionality option using the remote control unit, for example using a dedicated button on the remote control unit. Alternatively, the call initiation can be started by performing a physical action on the remote control unit, such sliding out a movable microphone.

As described above for an incoming call, when the user selects to initiate a call, the CPU 202 first checks whether there is sufficient power at the audio power source 214 to support the call.

If there is sufficient power, the remote control unit 200 activates the Bluetooth transceiver 206 and the microphone circuitry 208 and sends an IR command to the TV 100. The TV UI 118 sends a message to the client engine 114 to initiate the call to the second user 414. This is performed in a similar manner to that described above for a call initiated from the second user 414 to the first user 402. The call can then proceed in the same manner as described previously.

If there is not sufficient power, the remote control 200 sends a notification via the IR transmitter to the TV 100. The TV 100 can then notify the user of the depleted audio power source 214, as outlined above for an incoming call with reference to FIG. 5.

The VoIP packets for calls between users (such as 402 and 414) as described above are passed across the network 406 only, and the public switched telephone network ("PSTN") (424) is not involved. Furthermore, in the preferred embodiment of a P2P system, the actual voice calls between users of the communication system can be made with no central servers being used. This has the advantages that the network scales easily and maintains a high voice quality, and the call can be made free to the users.

However, in addition, calls can also be made from the embedded communication client 410 using the packet-based communication system to fixed-line or mobile telephones (e.g. 426), by routing the call to the PSTN network 424. Similarly, calls from fixed-line or mobile telephones 426 can be made to the packet-based communication system via the PSTN 424. In this case, the remote callers (i.e. the PSTN or mobile users) cannot be informed of the reason why the first user 402 is unable to have a voice call, as it is not possible to send an IM message or mood message to these users.

As mentioned above, in addition to making voice calls, the user 402 of the client 410 can also communicate with the users listed in the contact list in several other ways. For example, an instant message (also known as a chat message) can be sent to a contact. As with voice calls, the remote control unit 200 can be used for instant messaging. Text data can be input using the number keys 210, which are also used to enter alphabetic characters. The text data is transmitted to the TV 100 using the IR transmitter 204, as this is more power-efficient than Bluetooth and does not require a high data rate. As a result of this, IM messages can be sent even if the audio power source 214 is depleted.

The TV UI 118 has a "chat entry state" in which key presses from the remote control unit (received at the IR receiver 124) are interpreted as alphanumeric characters that are passed to the client engine 114. The chat entry state can be entered when a user responds to an incoming chat message, or when the user 402 selects a "chat" option displayed in the UI. The chat message data is encoded and sent from the client engine 114 over the network 406 to the communication client 420 of, for example, the second user 414. The message is displayed to the second user 414 on the user terminal 416. The second user 414 can respond by entering his own chat message, which is sent by the client 420 and received at the client engine 114. The client engine passes the message to the TV UI 118, which displays the message to the user 402 on the screen 102.

In addition to the remote control unit 200 checking the power levels of the audio power source 214, and reporting the status to the TV 100 over IR at call set-up (i.e. either receiving an incoming call or attempting to establish a call), the remote control 200 can also perform periodic reporting of the audio power source status. The CPU 202 can perform the check of the audio power source 214 at periodic intervals, and determine whether the power level has fallen below a predetermined threshold (as in S504 and S506 in FIG. 5). In one embodiment, a message can be sent to the TV UI 118 using the IR transmitter 204 as soon as the power level has been detected to be below the threshold. In an alternative, preferred, embodiment, a message regarding the status of the audio power supply 214 can be sent to the TV UI 118 using the IR transmitter 204 whenever other information is transmitted to the TV 100 using IR (e.g. changing TV channels, sending an IM message, etc.) This is preferred, as it is more likely that the remote control unit 200 is pointed towards the TV 100 when the user is sending other commands to the TV 100, and therefore IR power source 212 resources are not wasted by sending periodic power level status messages when a line of sight to the TV 100 is not present, or the TV 100 is switched off. The power level status messages can be "piggybacked" to any other messages sent using IR from the remote control unit 200 to the TV 100. The TV UI 118 can report the status of the audio power source power level to the user 402 by generating a notification message which is displayed on the screen 102.

The above-described system therefore provides a power management technique for an enhanced remote control unit. By providing two separate communication devices (such as IR and Bluetooth) which are powered by separate power sources the remote control unit can retain limited functionality when the more power-hungry of the two communication devices has depleted its power source. The depletion of the one power source can be reported to the user, even in the case that the power of that power source is completely depleted. In other words, the remote control is not limited to reporting only a "battery low" condition, but can report complete depletion. The monitoring and reporting of the power level of the one power source enables the user to be clearly informed of the status though on-screen notifications. In addition, third parties can be informed that the user is unable to receive voice calls (due to depletion of the power source), but that alternative communication methods can be used instead.

While this invention has been particularly shown and described with reference to preferred embodiments, it will be understood to those skilled in the art that various changes in form and detail may be made without departing from the scope of the invention as defined by the appendant claims. In particular, whist the embodiments described above have been described with reference to a TV with an embedded communication client, it should be understood that the client can also be embedded in a set top box or video playback device connected to a conventional TV. Furthermore, whilst the invention has been described in the context of a P2P communication system, it will be understood that the invention can be used in combination with other, non-P2P, packet-based communication systems.

According to the invention in certain embodiments there is provided a games console system as described above having the following features:

The system may comprise a games console unit, the games console unit comprising:
    a memory storing a communication client application;
    a communication processing means, coupled to the memory and operable to execute the communication client application, wherein the client application is programmed so as when executed to allow a user to establish a call with one or more other users via a packet-based communication network;
    a first wireless receiver arranged to receive signals from the first wireless transmitter of the remote control unit and coupled to the communication processing means;
    a second wireless receiver arranged to receive signals from the second wireless transmitter of the remote control unit and coupled to the communication processing means.

The first wireless receiver may be arranged to receive the status message from the first wireless transmitter and provide the status message to the communication processing means, and the communication processing means may be arranged to generate a warning message for display to the user responsive thereto.

The warning message may indicate to the user that a call cannot be established over the packet-based communication network due to depletion of the second power source.

The communication processing means may be arranged to transmit a notification message to the one or more other users over the packet-based communication network responsive to receiving the status message from the remote control unit.

The notification message may indicate to the one or more other users that a call cannot be established with the user over the packet-based communication network.

According to the invention in certain embodiments there is provided a video-playback system as described above having the following features.

The system may comprise a video-playback unit, the video-playback unit comprising:
    a memory storing a communication client application;
    a communication processing means, coupled to the memory and operable to execute the communication client application, wherein the client application is programmed so as when executed to allow a user to establish a call with one or more other users via a packet-based communication network;
    a first wireless receiver arranged to receive signals from the first wireless transmitter of the remote control unit and coupled to the communication processing means; and
    a second wireless receiver arranged to receive signals from the second wireless transmitter of the remote control unit and coupled to the communication processing means.

The first wireless receiver may be arranged to receive the status message from the first wireless transmitter and provide the status message to the communication processing means, and the communication processing means may be arranged to generate a warning message for display to the user responsive thereto.

The warning message may indicate to the user that a call cannot be established over the packet-based communication network due to depletion of the second power source.

The communication processing means may be arranged to transmit a notification message to the one or more other users over the packet-based communication network responsive to receiving the status message from the remote control unit.

The notification message may indicate to the one or more other users that a call cannot be established with the user over the packet-based communication network.

The invention claimed is:

1. A remote control unit for controlling a media device, comprising:
    a first wireless transmitter arranged to be powered from a first power source;
    a second wireless transmitter arranged to be powered from a second power source;
    a processor coupled to the first and second wireless transmitters, wherein the processor is configured to control transmission of data from the first and second wireless transmitters and is arranged to be powered from the first power source; and monitoring means arranged to monitor power levels of the second power source and provide power level information associated with the second power source to the processor, wherein the processor is further arranged to enable transmission of a status message to a television associated with the remote control unit to be displayed on the television comprising information associated with the second power source using the first wireless transmitter powered by the first power source, the information associated with the second power source comprising a notification that the second power source is completely depleted.

2. A remote control unit according to claim 1, wherein the processor is further arranged to compare the power level information associated with the second power source to a predetermined threshold level, and transmit another status message using the first wireless transmitter if the power level information associated with the second power source is less than the predetermined threshold level.

3. A remote control unit according to claim 1, further comprising microphone circuitry arranged to provide audio information to the processor, and arranged to be powered from the second power source.

4. A remote control unit according to claim 3, wherein the processor is arranged to transmit data representing the audio information using the second wireless transmitter.

5. A remote control unit according to claim 1, wherein the first wireless transmitter is an infra-red transmitter.

6. A remote control unit according to claim 1, wherein the second wireless transmitter is a radio transmitter.

7. A remote control unit according to claim 6, wherein the radio transmitter is a Bluetooth transmitter.

8. A remote control unit according to claim 1, wherein the first and second power sources are batteries.

9. A remote control unit according to claim 1, wherein the monitoring means is arranged to monitor the voltage level of the second power source.

10. A system comprising a remote control unit, the remote control unit comprising:
a first wireless transmitter arranged to be powered from a first power source;
a second wireless transmitter arranged to be powered from a second power source;
a processor coupled to the first and second wireless transmitters, wherein the processor is configured to control the first and second wireless transmitters and is arranged to be powered from the first power source; and
monitoring means arranged to monitor power levels of the second power source and provide power level information associated with the second power source to the processor,
wherein the processor is further arranged to:
transmit, via the first wireless transmitter, a first status message indicating the power level associated with the second power source has dropped below a certain threshold; and
transmit, via the first wireless transmitter, a second status message to a system unit associated with the remote control unit to be displayed on the system unit indicating the second power source is completely depleted of power.

11. A system according to claim 10, wherein the system unit comprises:

a memory storing a communication client application;
a communication processing means, coupled to the memory and operable to execute the communication client application, wherein the client application is programmed so as when executed to allow a user to establish a call with one or more other users via a packet-based communication network;
a first wireless receiver arranged to receive signals from the first wireless transmitter of the remote control unit and coupled to the communication processing means; and
a second wireless receiver arranged to receive signals from the second wireless transmitter of the remote control unit and coupled to the communication processing means.

12. A system according to claim 11, wherein the system unit is one of a television receiver unit, a games console unit or a video-playback unit.

13. A system according to claim 11, wherein:
the first wireless receiver is arranged to:
receive status messages from the first wireless transmitter; and
provide the status messages to the communication processing means; and
the communication processing means is arranged to generate at least one warning message for display to the user responsive thereto.

14. A system according to claim 13, wherein at least one warning message indicates to the user that a call cannot be established over the packet-based communication network due to depletion of the second power source.

15. A system according to of claim 11, wherein the communication processing means is arranged to transmit a notification message to the one or more other users over the packet-based communication network responsive to receiving the status message from the remote control unit.

16. A system according to claim 15, wherein the notification message indicates to the one or more other users that a call cannot be established with the user over the packet-based communication network.

17. A system according to claim 11, wherein the system unit comprises television receiver means operable to receive broadcast television signals.

18. A system according to claim 17, wherein the television receiver means is arranged to be controlled by commands transmitted from the first wireless transmitter of the remote control unit and received at the first wireless receiver.

19. A television receiver system according to claim 11, wherein the system comprises one of a television set and a set-top box.

20. A television receiver system according to claim 11, wherein the client application is configured to establish a call with one or more other users via a peer-to-peer packet-based communication network.

21. A system according to claim 11, wherein the system unit is a video-playback unit comprising one of a video disc player and a personal video recorder.

22. A method of monitoring power in a remote control unit for controlling a media device, the remote control unit having a first wireless transmitter arranged to be powered from a first power source and a second wireless transmitter arranged to be powered from a second power source, the method comprising:
measuring a power level of the second power source;
comparing the power level of the second power source to a predetermined threshold; and
transmitting a status message to a television associated with the remote control unit to be displayed on the television using the first wireless transmitter in the case that the power level of the second power source is less than the predetermined threshold, the transmitting including an ability to transmit a status message indicating that the second power source is completely depleted of power.

23. A method according to claim 22, further comprising the step of receiving a signal to accept an incoming call request from a user of the remote control unit, and wherein the steps of measuring, monitoring and transmitting are performed responsive to receiving the signal to accept an incoming call.

24. A method according to claim 22, further comprising the step of receiving a signal to initiate a call from a user of the remote control unit, and wherein the steps of measuring, monitoring and transmitting are performed responsive to receiving the signal to initiate a call.

25. A method according to claim 22, further comprising the step of starting a periodic timer, wherein the steps of measuring and monitoring are performed responsive to the expiry of the periodic timer.

26. A method according to claim 25, wherein the step of transmitting is performed responsive to the expiry of the periodic timer.

27. A method according to claim 25, wherein the step of transmitting is performed responsive to receiving a command to transmit a signal using the first wireless transmitter from a user of the remote control unit.

28. The remote control unit as recited in claim 1, wherein the processor is further arranged to:
  detect when a user of the remote control unit has selected to answer an incoming call with one or more other users via a packet-based network;
  responsive to detecting the user has selected to answer the incoming call, read the power level information associated with the second power source; and
  transmit a message containing an indication of whether the user is able to accept the incoming call, the indication based, at least in part, on the power level information.

29. The method as recited in claim 22, wherein the remote control unit further comprises an audio speaker powered by the second power source.

30. The method as recited in claim 23, wherein the signal to accept an incoming call request is generated, at least in part, in response to detecting a physical motion of a movable microphone unit associated with the remote control unit.

* * * * *